US012387863B2

(12) United States Patent
Wang

(10) Patent No.: US 12,387,863 B2
(45) Date of Patent: Aug. 12, 2025

(54) ELECTRICALLY DRIVEN FASTENER STRUCTURE AND METHOD OF USE THEREOF

(71) Applicant: FIVEGRAND INTERNATIONAL CO., LTD., New Taipei (TW)

(72) Inventor: Ting-Jui Wang, New Taipei (TW)

(73) Assignee: FIVEGRAND INTERNATIONAL CO., LTD., New Taipei (TW)

( * ) Notice: Subject to any disclaimer, the term of this patent is extended or adjusted under 35 U.S.C. 154(b) by 617 days.

(21) Appl. No.: 17/707,995

(22) Filed: Mar. 30, 2022

(65) Prior Publication Data
US 2022/0328228 A1   Oct. 13, 2022

(30) Foreign Application Priority Data

Apr. 9, 2021   (TW) .................................. 110112959

(51) Int. Cl.
*H01F 7/20*   (2006.01)
(52) U.S. Cl.
CPC .................................. *H01F 7/206* (2013.01)
(58) Field of Classification Search
CPC .......... H01F 7/206; H01F 7/17; H01F 7/1623; F16B 5/0208; F16B 1/04; F16B 5/00; H01H 3/122
See application file for complete search history.

(56) References Cited

U.S. PATENT DOCUMENTS

| | | | | |
|---|---|---|---|---|
| 2,923,792 A | * | 2/1960 | Carroll ............... | H01H 51/2236 335/82 |
| 3,662,288 A | * | 5/1972 | Carlson .................... | H01H 1/26 335/192 |
| 2002/0093408 A1 | * | 7/2002 | Morita ............... | H01H 33/6662 335/220 |
| 2007/0152784 A1 | * | 7/2007 | Habboosh .......... | H01H 36/0046 335/205 |
| 2016/0032952 A1 | * | 2/2016 | McBroom ............... | G06F 1/181 24/303 |
| 2021/0025438 A1 | * | 1/2021 | Wang .................... | F16B 5/0208 |

FOREIGN PATENT DOCUMENTS

| | | | | |
|---|---|---|---|---|
| CA | 2939867 C | * | 8/2021 | ............ H01F 7/066 |
| CN | 102102468 A | * | 6/2011 | |
| CN | 204129603 U | * | 1/2015 | |
| CN | 106032209 A | | 10/2016 | |
| CN | 111322298 A | | 6/2020 | |
| JP | 2007156929 A | | 6/2007 | |
| TW | I604296 B | | 11/2017 | |
| WO | WO-9943961 A1 | * | 9/1999 | ............. F16B 12/00 |
| WO | WO-0011351 A1 | * | 3/2000 | ............ F16B 1/0014 |

* cited by examiner

*Primary Examiner* — Mohamad A Musleh

(57) ABSTRACT

An electrically driven fastener structure includes a body, a fastening unit and a wire. The body has a first assembly portion. The fastening unit has a second assembly portion corresponding to the first assembly portion. The wire is adapted to pass a current and to pass through the first assembly portion or the second portion to form a magnetic switch using the first assembly portion or the second assembly portion, so as to drive the magnetic switch based on on or off or strong or weak of the current, or to drive the magnetic switch based on on or off or strong or weak of a magnetic force.

9 Claims, 21 Drawing Sheets

ELECTRICALLY DRIVEN FASTENER STRUCTURE AND METHOD OF USE THEREOF

This non-provisional application claims priority under 35 U.S.C. § 119(a) on Patent Application No(s). 110112959 filed in Taiwan, R.O.C. on Apr. 9, 2021, the entire contents of which are hereby incorporated by reference.

BACKGROUND OF THE INVENTION

1. Field of the Invention

The present invention provides a fastener structure and a method of use thereof, and in particular to an electrically driven fastener structure and a method of use thereof.

2. Description of the Related Art

In general, to couple two plates, a screw is usually locked therein to fix the two plates in a form that is not easily separated, thereby ensuring stable coupling between the two plates so that the two are unlikely to be detached from each other.

However, in the conventional connection means above, although the two plates can be coupled in a form that is not easily separated, the screw cannot be quickly assembled and secured with one of the plates.

BRIEF SUMMARY OF THE INVENTION

With extensive research and development, an electrically driven fastener structure and a method of use thereof are provided in the aim of achieving the object of quick assembly.

An electrically driven fastener structure provided according to a first embodiment of the present invention includes a body, a fastening unit and a wire. The body has a first assembly portion. The fastening unit has a second assembly portion corresponding to the first assembly portion. The wire is adapted to pass a current and to pass through the first assembly portion or the second portion to form a magnetic switch using the first assembly portion or the second assembly portion, so as to drive the magnetic switch based on on or off or strong or weak of the current, or to drive the magnetic switch based on on or off or strong or weak of a magnetic force.

A method of use of an electrically driven fastener structure provided according to a second embodiment of the present invention uses the electrically driven fastener structure above. The method includes passing a current through the first assembly portion or the second portion to form a magnetic switch using the first assembly portion or the second assembly portion, and driving the magnetic switch based on on or off or strong or weak of the current, or driving the magnetic switch based on on or off or strong or weak of a magnetic force.

A method of use of an electrically driven fastener structure provided according to a third embodiment of the present invention uses the electrically driven fastener structure above. The method includes passing a current through the first assembly portion or the second assembly portion to form a magnetic switch using the first assembly portion or the second assembly portion, and driving the magnetic switch based on on or off or strong or weak of the current, or driving the magnetic switch based on on or off or strong or weak of a magnetic force. The body is assembled at the first object, the first object has an insertion portion, and the insertion portion is electrically connected to the wire and is adapted to be hot-pluggable at a second object when electrically connected.

Accordingly, the electrically driven fastener structure and the method of use thereof of the present invention achieve the object of quick assembly.

DETAILED DESCRIPTION OF THE INVENTION

To facilitate understanding of the object, characteristics and effects of this present disclosure, embodiments together with the attached drawings for the detailed description of the present disclosure are provided.

Figure 1:
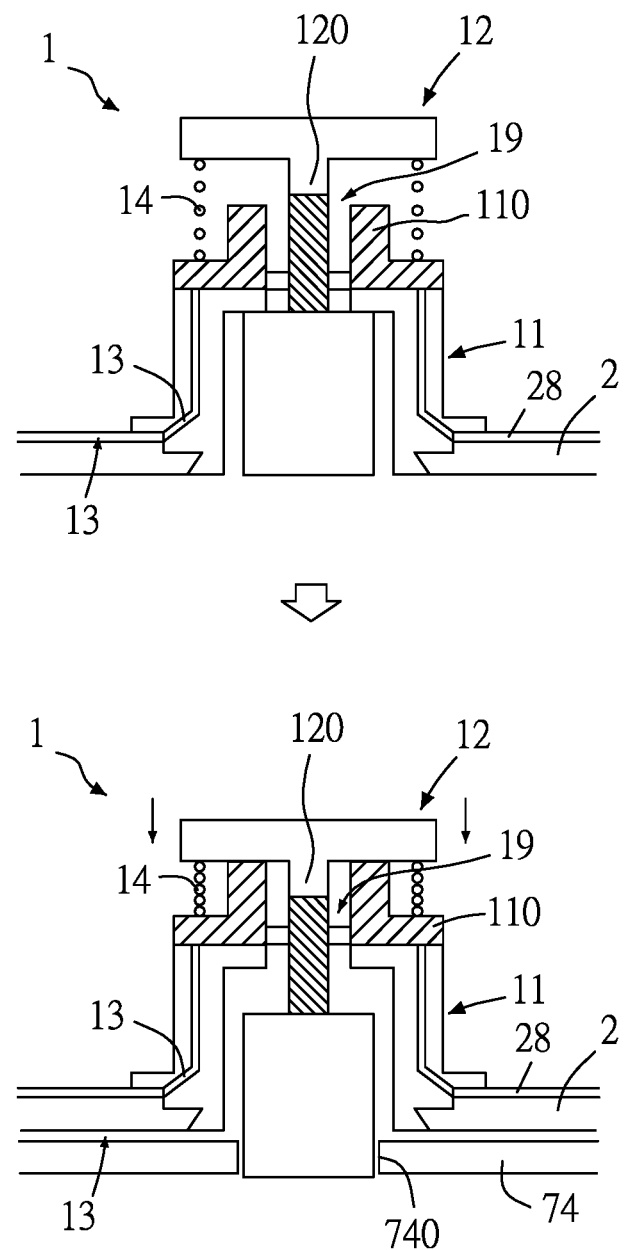
FIG. 1 is a first schematic diagram of an electrically driven fastener structure according to a specific embodiment of the present invention.
Figure 2:
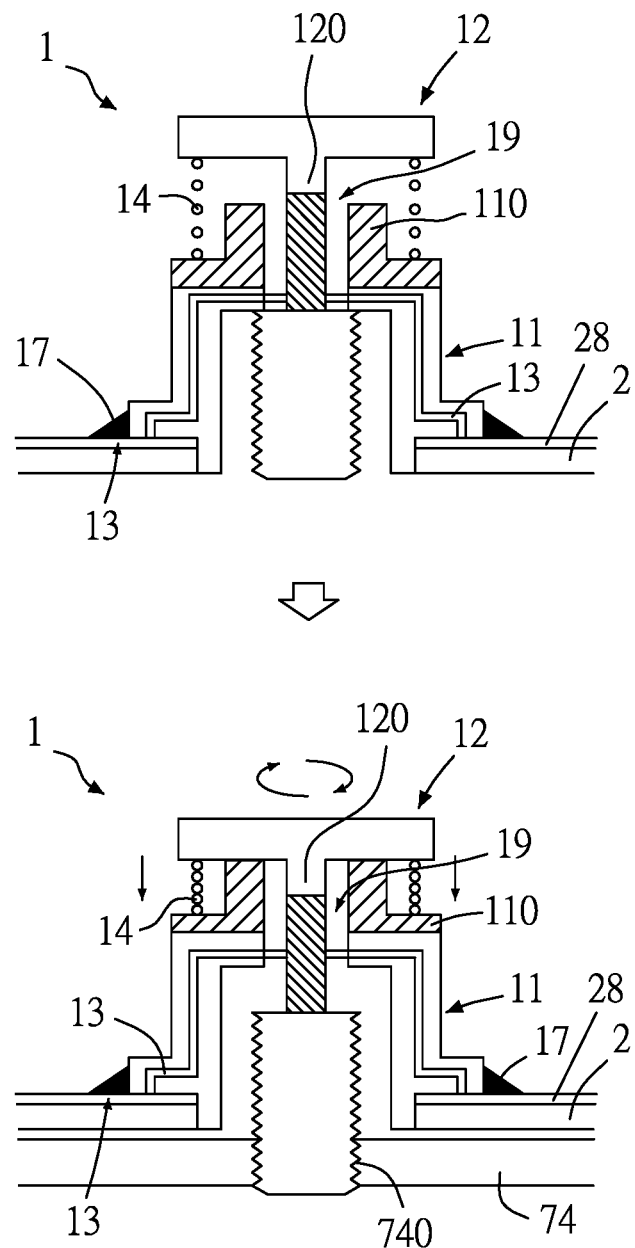
FIG. 2 is a second schematic diagram of an electrically driven fastener structure according to a specific embodiment of the present invention.

Referring to FIG. 1 to FIG. 5, an electrically driven fastener structure 1 provided according to a first embodiment of the present invention includes a body 11, a fastening unit 12 and a wire 13. The body 11 has a first assembly portion 110. The fastening unit 12 has a second assembly portion 120 corresponding to the first assembly portion 110. The wire 13 is adapted to pass a current, and to pass through the first assembly portion 110 (as shown in FIG. 1) or the second portion 120 (as shown in FIG. 2) to form a magnetic switch 19 using the first assembly portion 110 or the second assembly portion 120, so as to drive the magnetic switch 19 based on on or off or strong or weak of the current, or to drive the magnetic switch 19 based on on or off or strong or weak of a magnetic force.

Referring to FIG. 1 to FIG. 5 and FIG. 30, in one embodiment, the wire 13 first passes through a first object 2, and then passes through the first assembly portion 110 or the second assembly portion 120.

Figure 30:
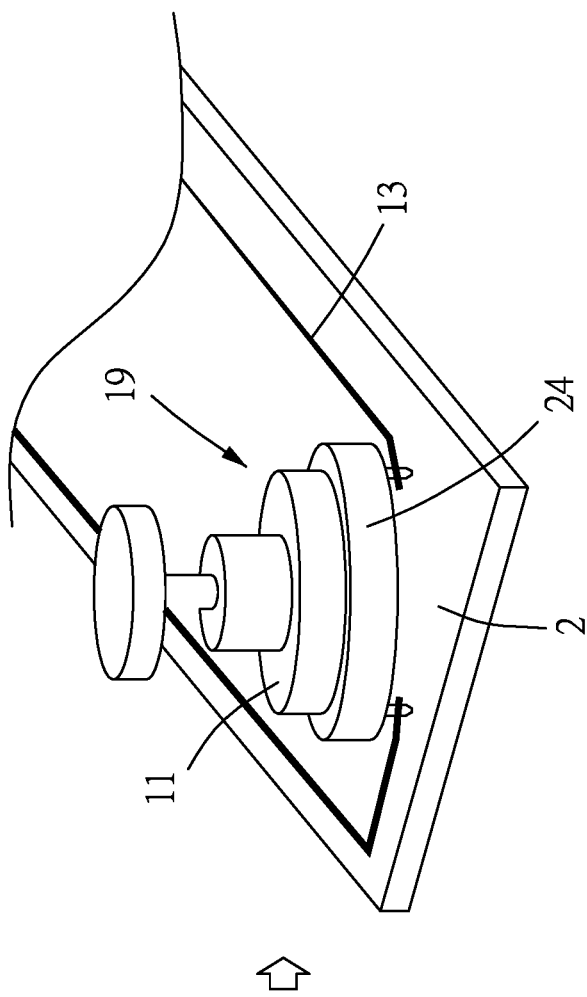
FIG. 30 is a seventh schematic diagram of an electrically driven fastener structure according to a specific embodiment of the present invention.
Figure 30:
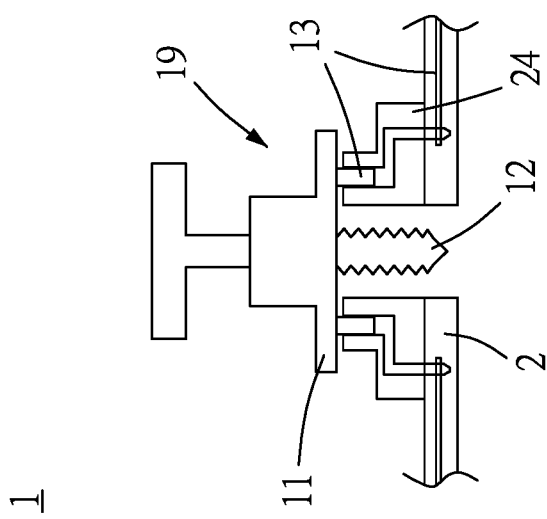

Referring to FIG. 1 to FIG. 5 and FIG. 3, in one embodiment, the wire 13 is adapted to pass a current, and to pass through the first object 2 and then pass through the first assembly portion 110 or the second assembly portion 120. The first object 2 has a first insertion portion 29, which is electrically connected to the wire 13 and is adapted to be hot-pluggable at an insertion portion 80 of a second object 8 when electrically connected. The second object 8 may be a power supply device, and the insertion portion 80 may be provided with a copper sheet. Moreover, the first object 2 or a pluggable second object 8 may be a motherboard, a PCB, a circuit board, a casing, a frame, a server, a hard drive, a memory or a computer, or a correspondingly engaged third object (not shown) may be a casing, a frame, a server, a motherboard, a PCB, a circuit board, a hard drive, a memory or a computer. In FIG. 30, the wire 13 is connectable to a connector 24 of the first object 2, so as to energize and drive the magnetic switch 19.

Referring to FIG. 1 to FIG. 5, a method of use of an electrically driven fastener structure according to a second embodiment of the present invention uses the electrically driven fastener structure 1 above. The method includes passing a current through the first assembly portion 110 or the second portion 120 to form a magnetic switch 19 using the first assembly portion 110 or the second assembly portion 120, and driving the magnetic switch 19 based on on or off or strong or weak of the current, or driving the magnetic switch 19 based on on or off or strong or weak of a magnetic force.

Referring to FIG. 1 to FIG. 5, a method of use of an electrically driven fastener structure provided according to a third embodiment of the present invention uses the electrically driven fastener structure 1 above, passes a current through the first assembly portion 110 or the second assembly portion 120 to form a magnetic switch 19 using the first assembly portion 110 or the second assembly portion 120, and drives the magnetic switch 19 based on on or off or strong or weak of the current, or drives the magnetic switch 19 based on on or off or strong or weak of a magnetic force. The body 11 is assembled at the first object 2, and the first object 2 has the insertion portion 29.

Accordingly, the electrically driven fastener structure 1 and the method of use thereof of the present invention achieve the object of quick assembly.

As shown in FIG. 1 and FIG. 2, in one embodiment, an elastic element 14 may be further included. Two ends of the elastic element 14 may be pressed against the first assembly portion 110 and the second assembly portion 120, respectively, so as to position the magnetic switch 19 at an on or off position when the magnetic force is absent. The elastic element 14 may be, for example but not limited to, a spring. In FIG. 1, the fastening unit 12 is adapted to be inserted into a fastened unit 740 of a fastened object 74, and in FIG. 2, the fastening unit 12 in a form of a stud is screw connected in the fastened unit 740 in a form of a screw hole, so that the fastening unit 12 is engaged at the fastened object 74. It should be noted that the present invention is not limited to the examples above.

Figure 4:
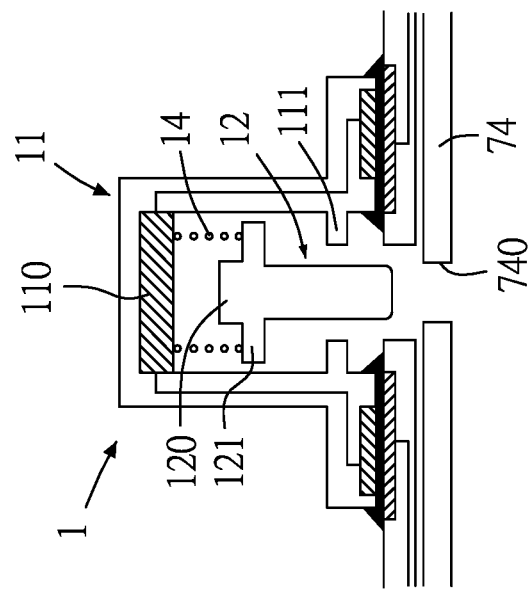
FIG. 4 is a third schematic diagram of an electrically driven fastener structure according to a specific embodiment of the present invention.
Figure 4:
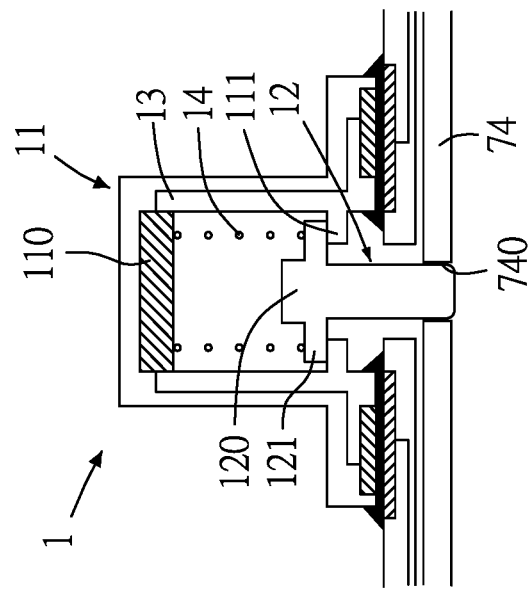

As shown in FIG. 4, in one embodiment, the fastening unit 12 is accommodated in the body 11, and the elastic element 14 is provided between the inside of the body 11 and the fastening unit 12. The body 11 has a stopping portion 111, and the fastening unit 12 has a corresponding stopping portion 121 adapted to stop at the stopping portion 111 when the magnetic force is on. It should be noted that the present invention is not limited to the examples above. The first assembly portion 110 or the second assembly portion 120 may be a magnetic portion so as to generate a magnet force when the current is on. For example, the first assembly portion 110 or the second assembly portion 120 as the magnetic portion may be made of a metal material, or the first assembly portion 110 or the second assembly portion 120 may be a magnetism generating portion. The wire 13 may have positive and negative power so as to generate a magnetic force, and the second assembly portion 120 or the first assembly portion 110 may be made of a metal material so as to be attracted by the magnetic force generated by the wire. The fastening unit 12 may be magnetically driven to perform an action of rotational engagement, vertical engagement, horizontal engagement, screw locking rotation, leverage lifting or pulling.

Figure 3:
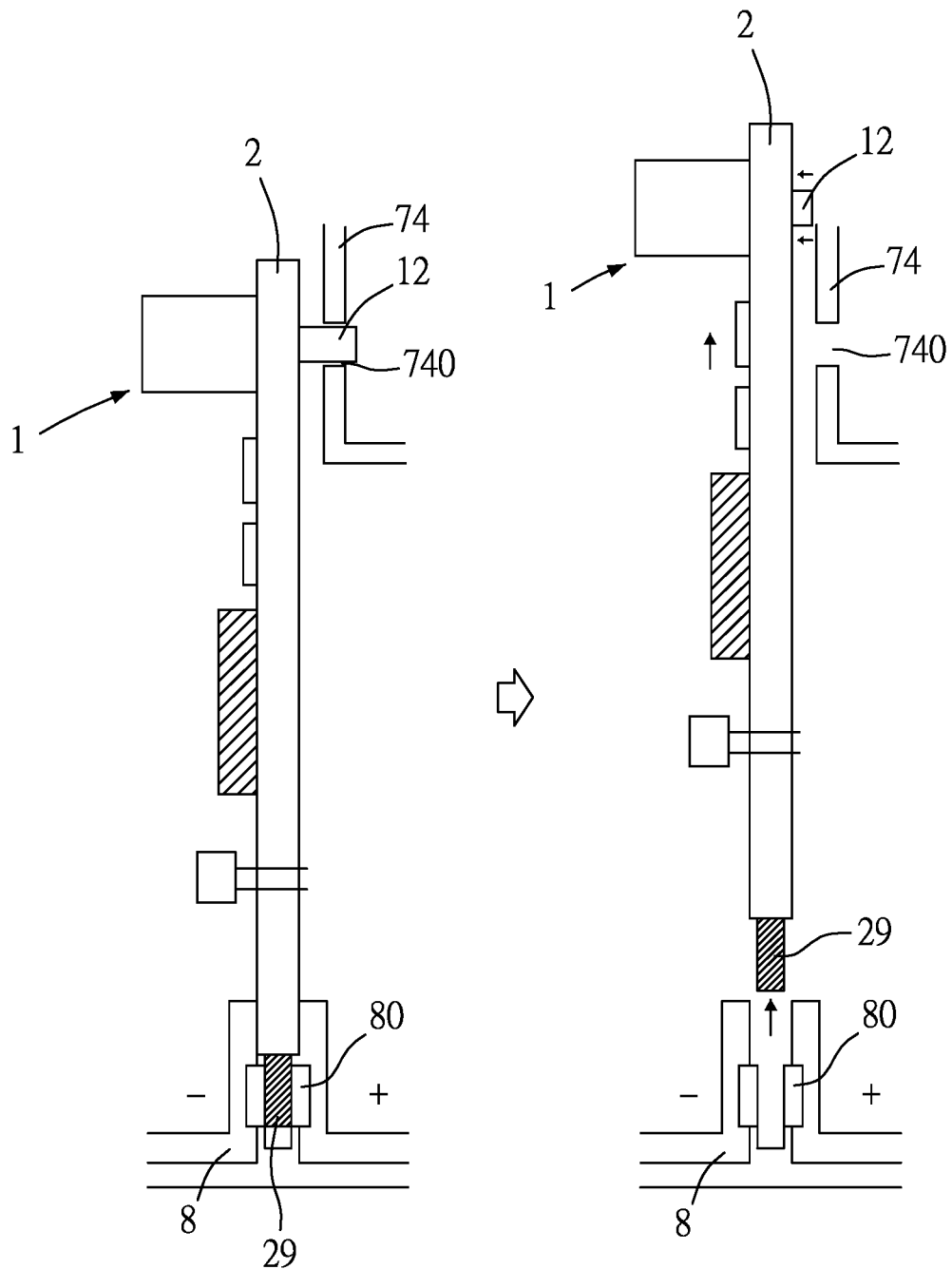
FIG. 3 is a schematic diagram of an electrically driven fastener structure according to a specific embodiment of the present invention, a first object and a second object.

As shown in FIG. 1 to FIG. 3, in one embodiment, the first object 2 is a printed circuit board, and the first object 2 has a wiring layer 28 so as to be electrically connected to the wire 13. The body 11 is adapted to be arranged at the first object 2, and the fastening unit 12 is for engaging with a fastened object 74. The insertion portion 29 of the first object 2 is adapted to be first inserted in the second object 8 and then engaged at the fastened object 74 via the fastening unit 12 to achieve assembly. Alternatively, the fastening unit 12 is adapted to be disengaged from the fastened object 74 and the insertion portion 29 of the first object 2 is then pulled out from the second object 8 to achieve separation. When the insertion portion 29 of the first object 2 is inserted into or pulled out from the second object 8, the second object 8 may be kept in an electrically connected state.

As shown in FIG. 2, the body 11 is arranged on the first object 2, the body 11 and the first object 2 have weldable surfaces 17, one between the weldable surfaces 17 of the body 11 and the first object 2 may be a copper layer and the other between the two may be a solder layer or a combination of a copper and a solder layer. It should be noted that the present invention is not limited to the examples above. The fastener structure may be welding connected, engagingly connected, rivet connected, expansion connected, lockingly connected, fittingly connected or adhesion connected to the first object 2.

Figure 5:
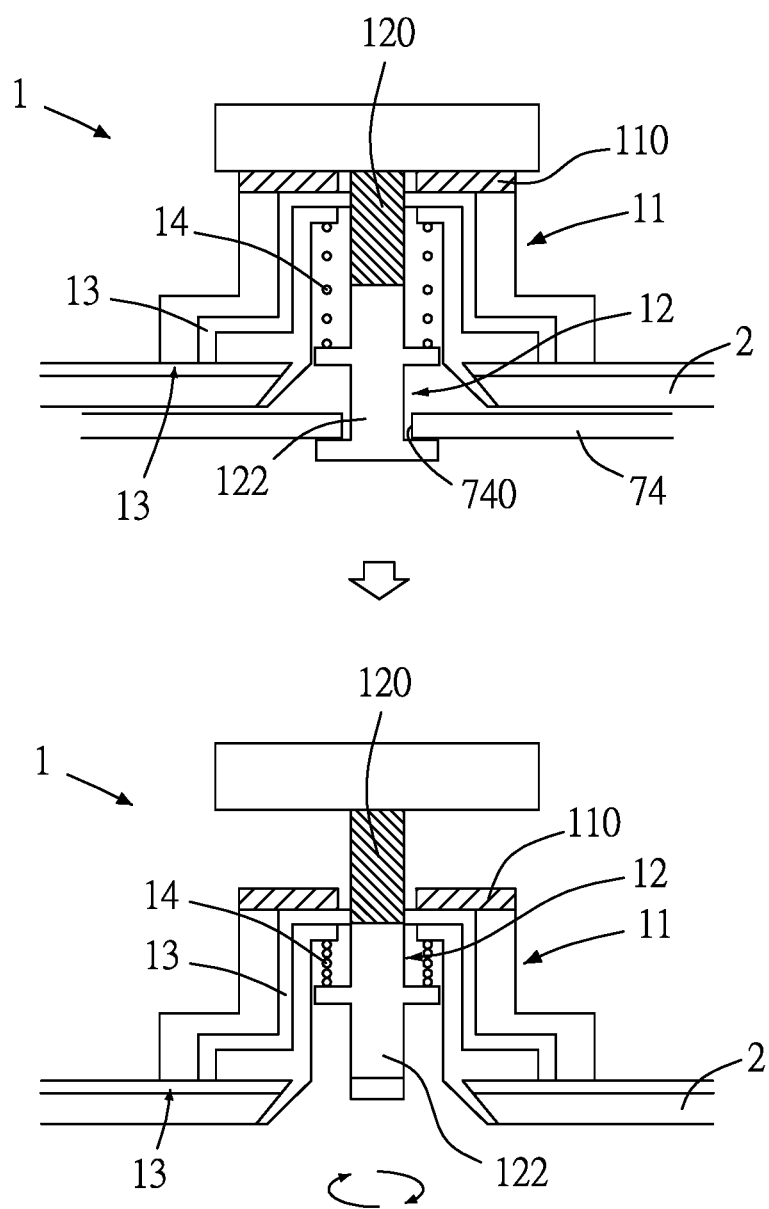
FIG. 5 is a fourth schematic diagram of an electrically driven fastener structure according to a specific embodiment of the present invention.

As shown in FIG. 5, in one embodiment, a bottom portion of the fastening unit 12 may be in a form of a lopsided H-shape so as to form a holding portion 122. The holding portion 122 is adapted to pass through the fastened unit 740 of the fastened object 74 and the fastening unit 12 is rotated to hold a bottom surface and a top surface of the fastened object 74.

Figure 6:
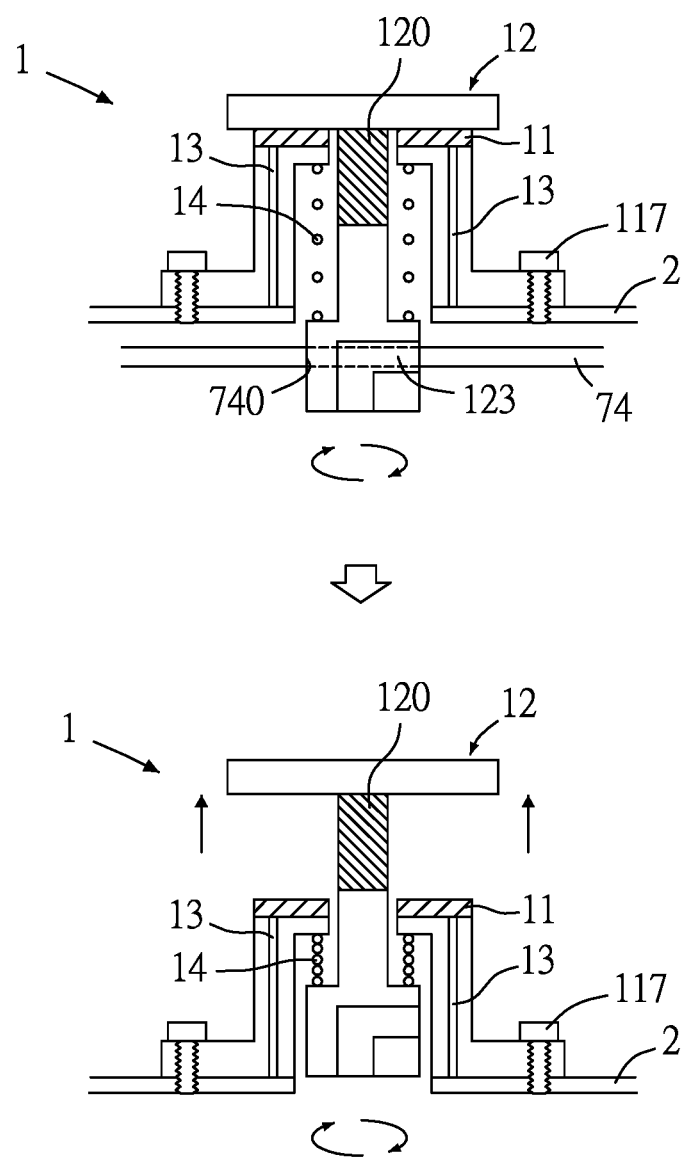
FIG. 6 is a fifth schematic diagram of an electrically driven fastener structure according to a specific embodiment of the present invention.

As shown in FIG. 6, in one embodiment, the fastening unit 12 has an engagement channel 123, and the fastening unit 12 is adapted to be rotated downward to have the engagement channel 123 be engaged at the fastened unit 740 of the fastened object 74. The body 11 may be locked on the first object 2 by, for example but not limited to, a plurality of bolts 117. In other embodiments, the fastening unit 12 may be a threaded portion, a column, an elastic unit, an outer fastener, an inner fastener, a recessed fastener, a rotation fastener, a protruding fastener, a handle, a latch, an auxiliary thruster or a pressing unit.

Figure 7:
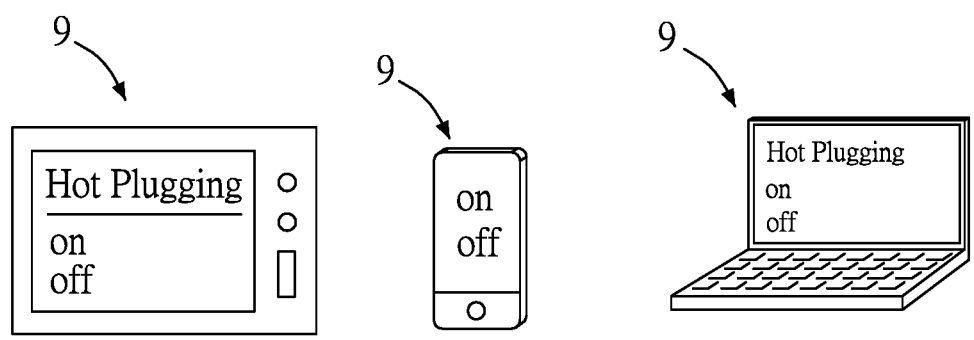
FIG. 7 is a schematic diagram of a control device applicable to an electrically driven fastener structure according to a specific embodiment of the present invention.

As shown in FIG. 1 and FIG. 7, in one embodiment, a control device 9 signally connected to the wire 13 may be used to control on and off of the magnetic switch, wherein the control device 9 is a control instrument, a cellphone, a mobile communication device, a computer, a wired electronic device or a wireless electronic device. Moreover, the control device 9 may also be signally connected to the fastening unit 12.

Figure 8:
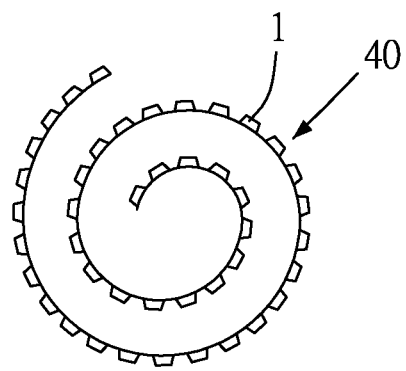
FIG. 8 is a first schematic diagram of a carrying member according to a specific embodiment of the present invention.
Figure 9:
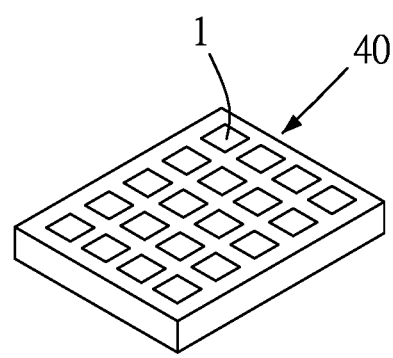
FIG. 9 is a second schematic diagram of a carrying member according to a specific embodiment of the present invention.
Figure 10:
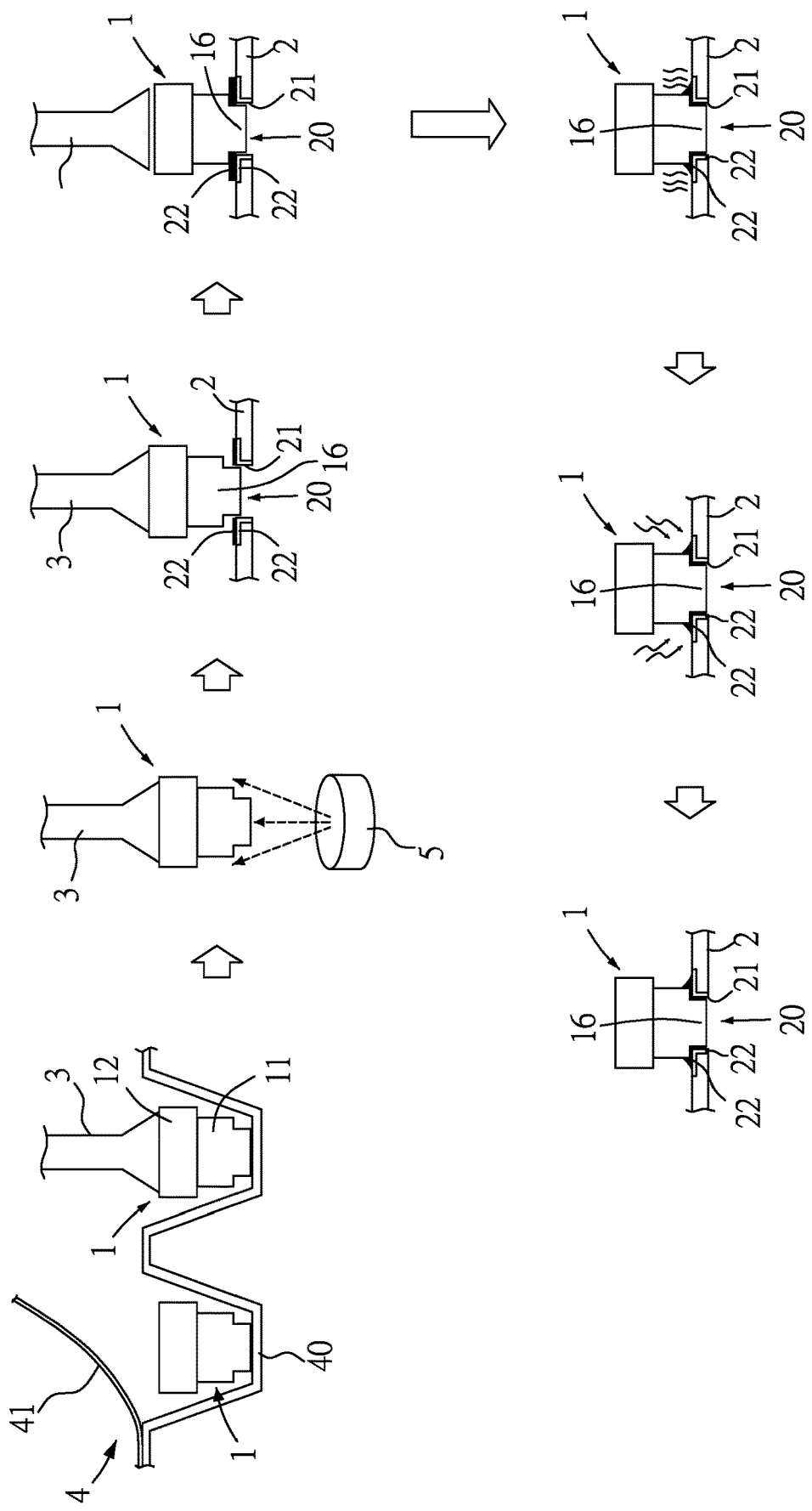
FIG. 10 is a fifth schematic diagram of an electrically driven fastener structure being operated according to a specific embodiment of the present invention.

As shown in FIG. 8 to FIG. 10, in one embodiment, the fastener structure 1 is adapted to be placed in a carrier 4, wherein the carrier 4 includes a carrying member 40 in which the fastener structure 1 is placed. A tool 3 is adapted to take out the fastener structure 1 and remove the fastener structure 1 out of the carrier 4, and the fastener structure 1 is moved onto the first object 2 and be assembled at the first object 2. The tool 3 may be a vacuum suction device, a clamp, a fixture or a magnetic suction device. In FIG. 8, the carrying member 40 may also be strip-shaped so as to be adapted to be rolled, or be a roll, a tape of a tray. Alternatively, in FIG. 9, the carrying member 40 may also be a plate.

As shown in FIG. 10, the fastener structure 1 may be first moved onto a calculation device 5 (or an image recognition device) before being assembled at the first object 2. The calculation device 5 is adapted to calculate relative positions of the fastener structure 1 and the first object 2, so as to install the fastener structure 1 to an opening 21 at a predetermined position 20 of the first object 2. The tool 3 takes out the fastener structure 1 from the body 11 in FIG. 13, and takes out the fastener structure 1 from the fastening unit 12 in FIG. 14. Means of the taking out may be selected according to different installation requirements. In one embodiment, the inside and the periphery of the opening 21 at the predetermined position 20 of the first object 2 are provided with a solder layer 22, and a solder layer 22 corresponding to the body 11 is provided on the solder layer 22. The fastener structure 1 is adapted to be moved by the tool 3 to above the predetermined position 20 and be released so as to enter the opening 21 by a joining portion 16 of the body 11, and the solder layer 22 and the solder layer 22 are then heated to weld the fastener structure 1 at the first object 2.

Figure 11:
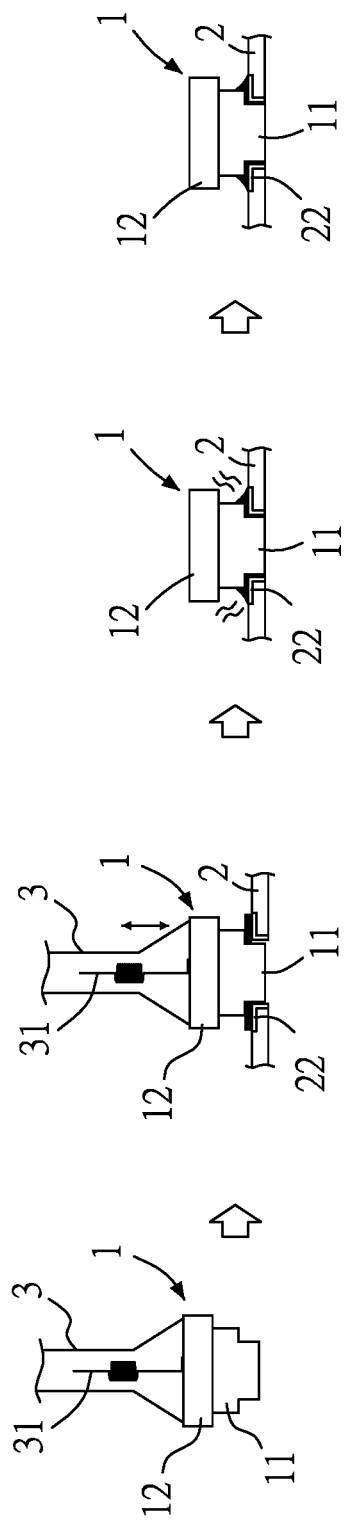
FIG. 11 is a sixth schematic diagram of an electrically driven fastener structure being operated according to a specific embodiment of the present invention.

As shown in FIG. 11, in one embodiment, the tool 3 is provided with a sensing element 31, and the tool 3 is notified to release the fastener structure 1 when the fastener structure 1 is moved to the predetermined position 20 and contacts the first object 2. The sensing element 31 may be provided with elasticity, so that a suction tip 33 of the tool 3 can be notified to release the fastener structure 1 when the tool 3 moves the fastener structure 1 to the predetermined position 20 that the contacts the first object 2.

Figure 12:
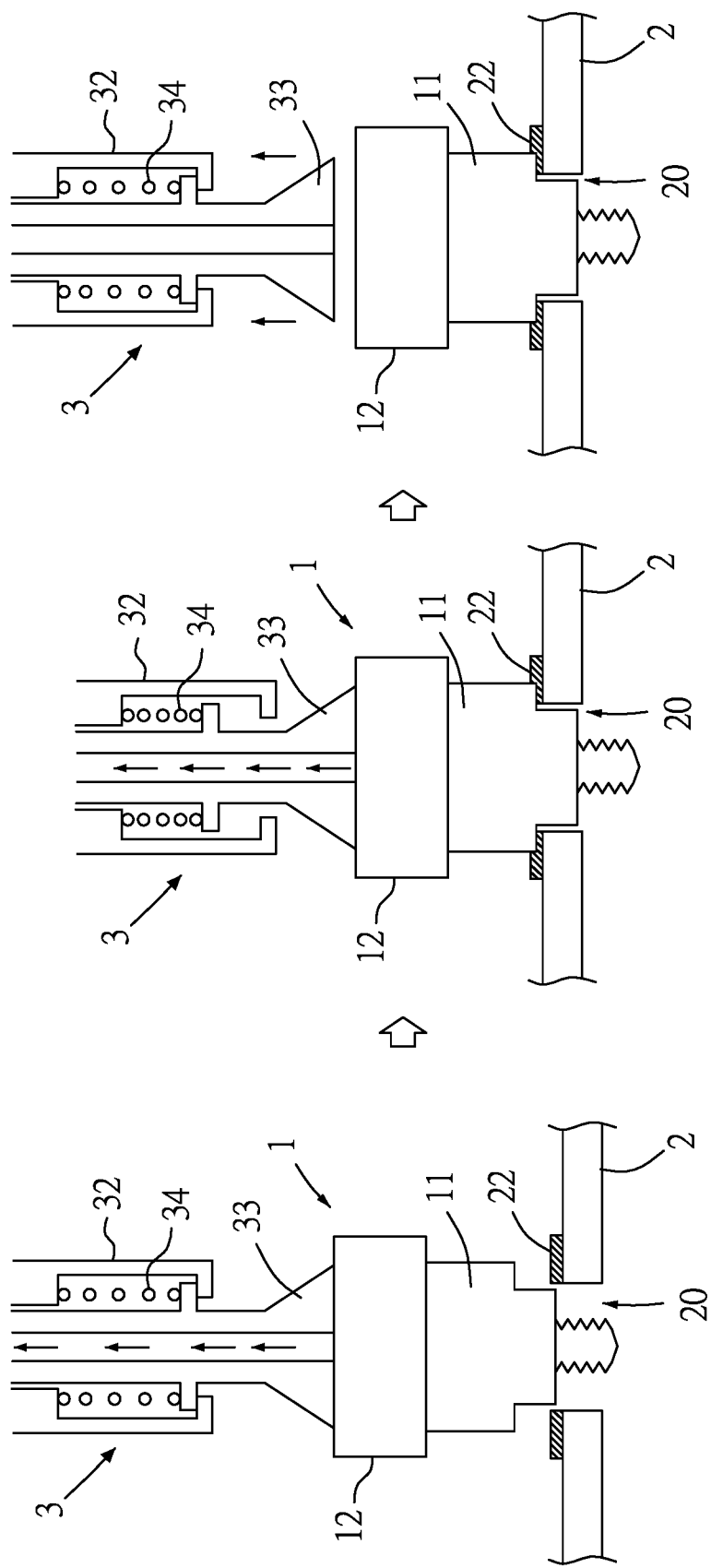
FIG. 12 is a seventh schematic diagram of an electrically driven fastener structure being operated according to a specific embodiment of the present invention.

As shown in FIG. 12, in one embodiment, the tool 3 has a vacuum cavity 33 and the suction tip 33 assembled at the vacuum cavity 32, and the vacuum cavity 32 is provided with an elastic element 34 therein, wherein the elastic element 34 presses between the suction tip 33 and an inner wall of the vacuum cavity 33. When the elastic element 34 is compressed, the vacuum degree in the vacuum cavity 32 rises to cause the suction tip 33 to suck up the fastener structure 1; when the elastic element 34 is released, the vacuum degree in the vacuum cavity 32 drops to cause the suction tip 33 to release the fastener structure 1 to the predetermined position 20. The elastic element 34 may be, for example but not limited to, a spring.

Figure 13:
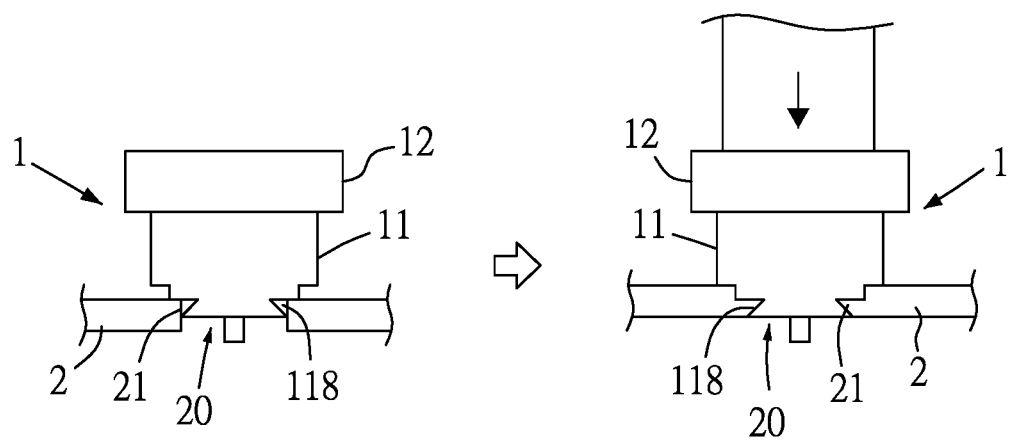
FIG. 13 is an eighth schematic diagram of an electrically driven fastener structure being operated according to a specific embodiment of the present invention.

As shown in FIG. 13, in one embodiment, the body 11 is recessed to form a coupling recess 118, the part of the body 11 having the coupling recess 118 is placed into the opening 21 of the first object 2, and the body 11 is adapted to be fitted by a body part larger than the opening 21 into the opening 21, so that the opening 21 or the material around the opening 21 is squeezed into the coupling recess 118 of the body 11 to arrange the body 11 at the first object 2.

Figure 14:
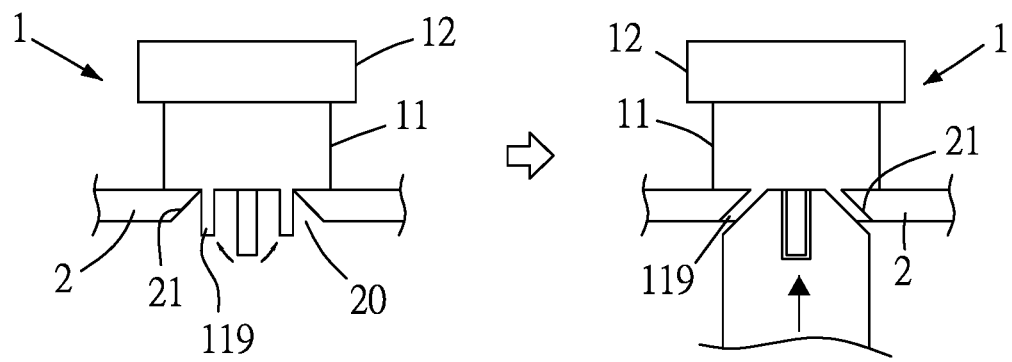
FIG. 14 is a ninth schematic diagram of an electrically driven fastener structure being operated according to a specific embodiment of the present invention.

As shown in FIG. 14, in one embodiment, the body 11 is provided with bendable pressing portions 119, and the pressing portions 119 are adapted to be placed into the opening 21 of the first object 2 to arrange the body 11 at the first object 2. For example, a bending tool 58 may be used to bend the pressing portions 119.

Figure 15A:
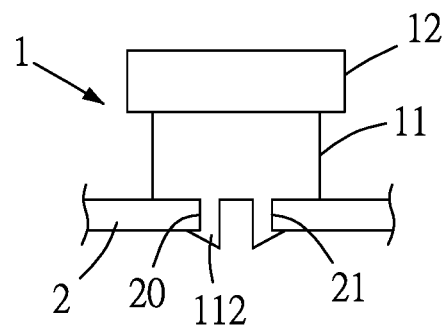
FIG. 15A is a first schematic diagram of an electrically driven fastener structure according to a specific embodiment of the present invention installed to a first object.
Figure 15B:
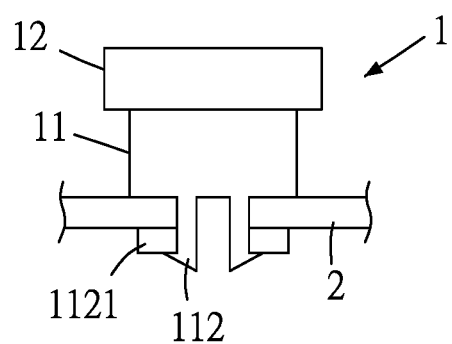
FIG. 15B is a second schematic diagram of an electrically driven fastener structure according to a specific embodiment of the present invention installed to a first object.
Figure 20:
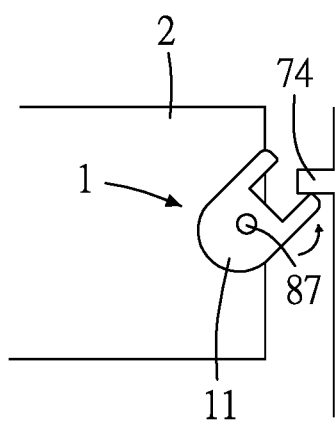
FIG. 20 is an eleventh schematic diagram of an electrically driven fastener structure being operated according to a specific embodiment of the present invention.

As shown in FIG. 15A and FIG. 15B, in one embodiment, the bottom portion of the body 11 has an elastic hook 112 that passes through the opening 21 of the first object 21 and becomes hooked at a bottom surface of the first object 2. In FIG. 20B, a tightening member 1121 is further provided between the bottom surface of the first object 2 and the elastic hook 113 to increase the tightness of coupling. The tightening member 112 may be an annular object.

Figure 16A:
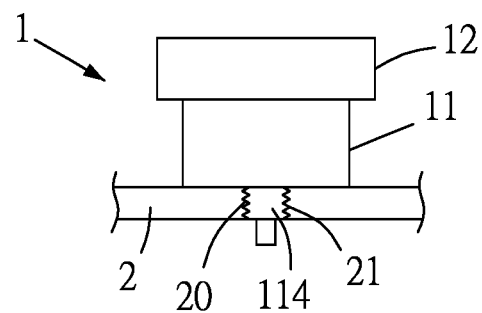
FIG. 16A is a third schematic diagram of an electrically driven fastener structure according to a specific embodiment of the present invention installed to a first object.
Figure 16B:
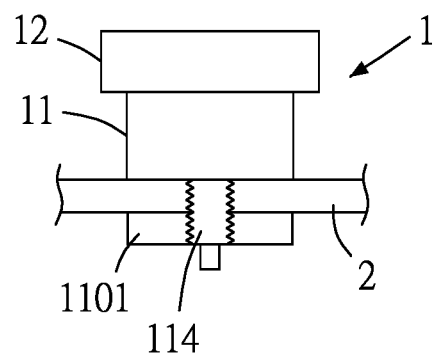
FIG. 16B is a fourth schematic diagram of an electrically driven fastener structure according to a specific embodiment of the present invention installed to a first object.
Figure 21:
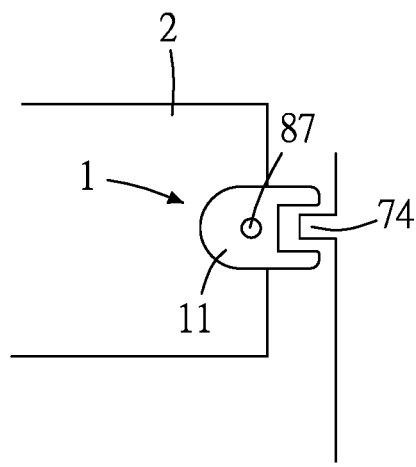
FIG. 21 is a twelfth schematic diagram of an electrically driven fastener structure being operated according to a specific embodiment of the present invention.
Figure 22:
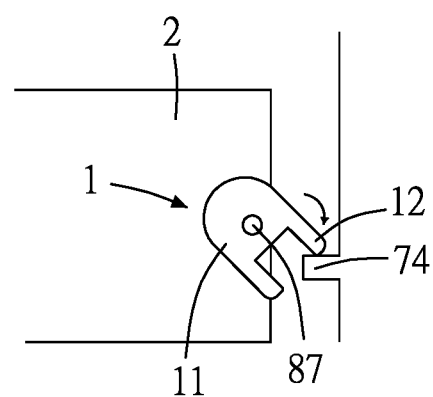
FIG. 22 is a thirteenth schematic diagram of an electrically driven fastener structure being operated according to a specific embodiment of the present invention.
Figure 23:
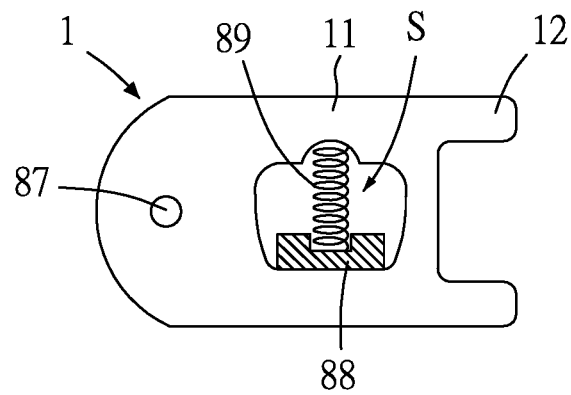
FIG. 23 is a sixth schematic diagram of an electrically driven fastener structure according to a specific embodiment of the present invention.

As shown in FIG. 16A and FIG. 16B, in one embodiment, the bottom portion of the body 11 has a stud 114 that locks at the opening 21 in a form of a screw hole structure of the first object 2. In FIG. 21B, the stud 114 may pass through the bottom surface of the first object 2 so as to be further locked by a locking member 1101 to increase the tightness of coupling. The locking member 1101 may be a nut.

Figure 17:
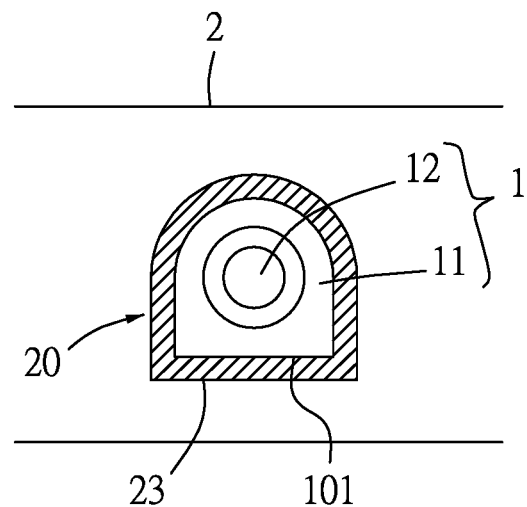
FIG. 17 is a top schematic diagram of an electrically driven fastener structure according to a specific embodiment of the present invention installed to a first object.

As shown in FIG. 17, in one embodiment, the body 11 has an anti-rotation portion, and a corresponding anti-rotation portion is provided at the predetermined position 20 to mutually achieve anti-rotation. The solder layer 22 may be provided along the periphery of the predetermined position 20, the solder layer 22 is heated and cooled after the body 11 is placed at the predetermined position 20 so as to weld the body 11 at the first object 2, with the heated and cooled solder layer 22 present between the body 11 and the first object 2.

Figure 18:
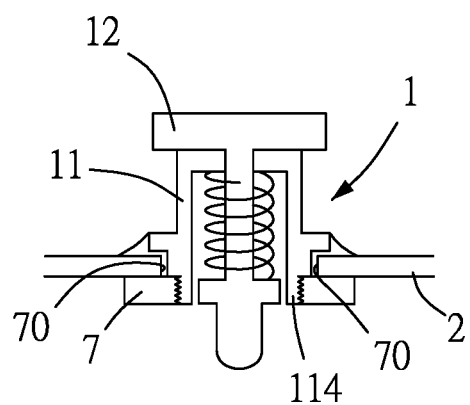
FIG. 18 is a fifth schematic diagram of an electrically driven fastener structure according to a specific embodiment of the present invention installed to a first object.
Figure 19:
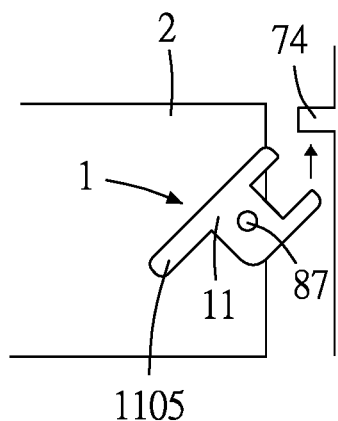
FIG. 19 is a tenth schematic diagram of an electrically driven fastener structure being operated according to a specific embodiment of the present invention.

As shown in FIG. 18, in one embodiment, the body 11 has an engaging portion having the stud 114 for mutually engaging with an engaging member 7 after heating and cooling are performed and the body 11 is welded at the first object 2.

Figure 24:
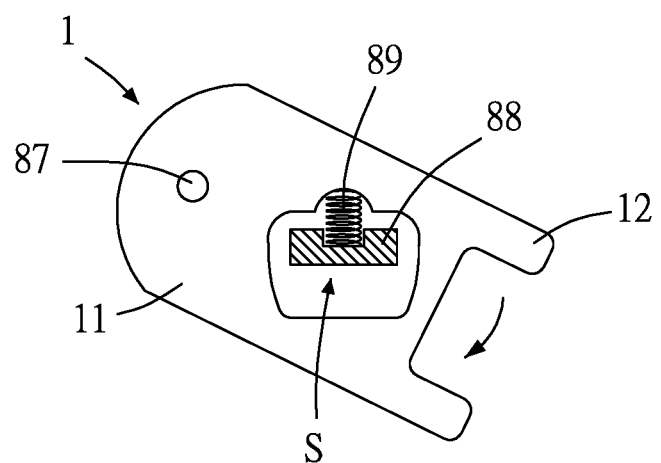
FIG. 24 is a fourteenth schematic diagram of an electrically driven fastener structure being operated according to a specific embodiment of the present invention.
Figure 25:
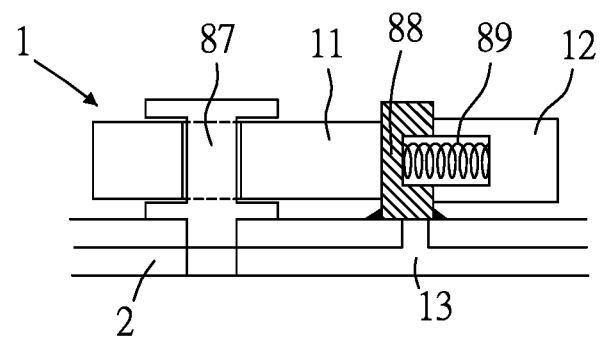
FIG. 25 is a section view corresponding to FIG. 23.
Figure 26:
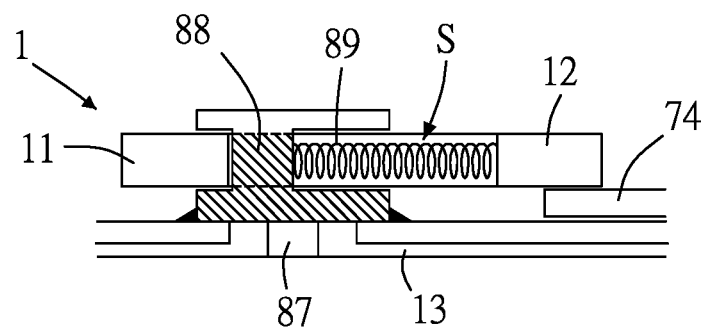
FIG. 26 is a fifteenth schematic diagram of an electrically driven fastener structure being operated according to a specific embodiment of the present invention.
Figure 27:
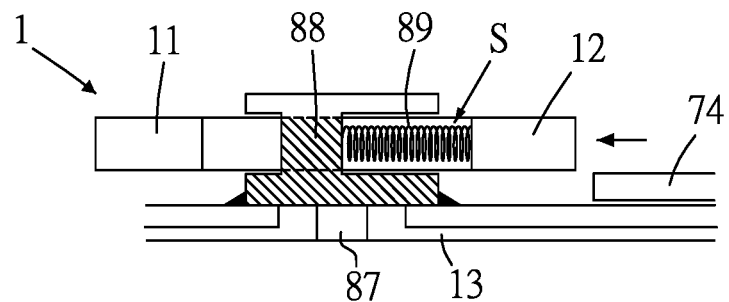
FIG. 27 is a sixteenth schematic diagram of an electrically driven fastener structure being operated according to a specific embodiment of the present invention.
Figure 28:
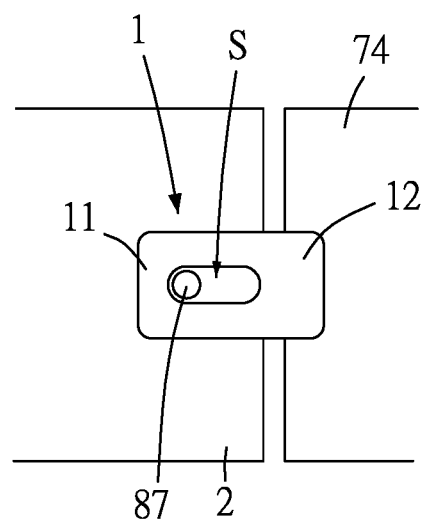
FIG. 28 is a top view corresponding to FIG. 26.
Figure 29:
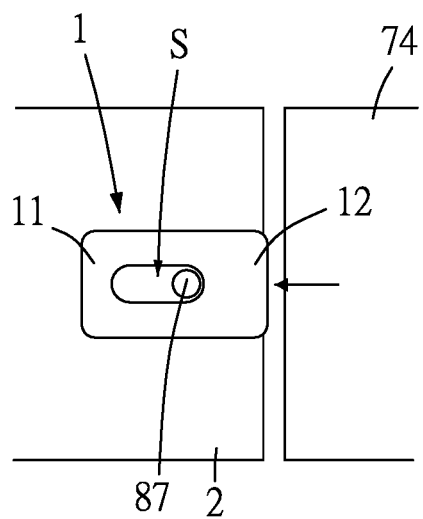
FIG. 29 is a top view corresponding to FIG. 27.

As shown in FIG. 19 to FIG. 22, in one embodiment, the body 11 may be movably assembled at the first object 2 by a movable assembly portion 87. In this embodiment, the movable assembly portion 87 acts, for example but not limited to, as a pivotal axis for the body 11 to be pivoted at the first object 2. The fastening unit 12 also rotates with the rotation of the body 11, and the fastening unit 12 at this point is for pushing the fastened unit 74. The fastening unit 12 may appear as a grip, and pushes the fastened unit 74 by means of leverage during rotation. In this embodiment, the body 11 and the fastening unit 12 assembled with each other appear as, for example but not limited to, an integral form, or may appear as a movable assembly or a fixed assembly. In FIG. 24, the body 11 may have a force application portion 1105, which is for applying a force in a manual operation. For example, the force application portion 1105 is a handle. The elastic element 88 may be a spring.

As shown in FIG. 23 to FIG. 28, in one embodiment, the body 11 has an activity space S, which provides the fastening unit 12 in motion with inner and outer movement spaces. A magnetic portion 88 and the movable assembly portion 87 may be arranged on two different positions of the first object 2. The magnetic portion 88 is located in the activity space S, and an elastic element 89 is connected between the body 11 and the magnetic portion 88. The magnetic portion 88 may also generate a magnetic force from a current provided by the wire 13 so as to connect to or disconnect from the body 11.

As shown in FIG. 26 to FIG. 29, in one embodiment, the activity space S is strip-shaped, and two ends of the elastic element 89 are respectively connected to the magnetic portion 88 and the fastening portion 12, allowing the fastener structure 1 to perform linear movement and hence the fastening unit 12 to perform linear movement. The current of the wire 13 is received via the magnetic portion 88 so as to control activities of the fastener structure 1, so that the fastening unit 12 is engaged with or disengaged from the fastened object 74. The movable assembly portion 87 may be used to press against two ends of the activity space S so as to limit a movement range of the fastener structure 1.

While the present disclosure has been described by means of specific embodiments, numerous modifications and variations could be made thereto by those skilled in the art without departing from the scope and spirit of the present disclosure set forth in the claims.

What is claimed is:

1. An electrically driven fastener structure, comprising:
   a body having a first assembly portion;
   a fastening unit having a second assembly portion corresponding to the first assembly portion;
   a wire adapted to pass a current and to pass through the first assembly portion or the second assembly portion to form a magnetic switch using the first assembly portion or the second assembly portion, so as to drive the magnetic switch based on on or off or strong or weak of the current, or to drive the magnetic switch based on on or off or strong or weak of a magnetic force; and
   an elastic element, wherein two ends of the elastic element are pressed against the first assembly portion and the second assembly portion, respectively, so as to position the magnetic switch at an on or off position when the magnetic force is absent.

2. The electrically driven fastener structure of claim 1, wherein the wire is adapted to pass a current and to pass through a first object and then pass through the first assembly portion or the second assembly portion.

3. The electrically driven fastener structure of claim 1, further comprising:
   a control device signally connected to the wire to control on and off of the magnetic switch, the control device being a control instrument, a cellphone, a mobile communication device, or a computer.

4. The electrically driven fastener structure of claim 1, wherein the first assembly portion or the second assembly portion is a magnetic portion, or the first assembly portion or the second assembly portion is a magnetism generating portion so as to generate a magnetic force when the current is conducted.

5. The electrically driven fastener structure of claim 1, wherein the wire has positive and negative power so as to generate a magnetic force, and the second assembly portion or the first assembly portion is made of a metal material so as to be attracted by the magnetic force generated by the wire.

6. The electrically driven fastener structure of claim 1, wherein the fastening unit is signally connected to a control device, the control device being a cellphone, a mobile communication device, a computer, a wired electronic device or a wireless electronic device.

7. A method of use of an electrically driven fastener structure, using the electrically driven fastener structure of claim 1, the method comprising:
   passing a current through the first assembly portion or the second portion to form a magnetic switch using the first assembly portion or the second assembly portion; and
   driving the magnetic switch based on on or off or strong or weak of the current, or driving the magnetic switch based on on or off or strong or weak of a magnetic force.

8. The electrically driven fastener structure of claim 1, wherein the fastening unit is magnetically driven to perform an action of rotational engagement, vertical engagement, horizontal engagement, screw locking rotation, leverage lifting or pulling.

9. The electrically driven fastener structure of claim 1, wherein the fastener structure is welding connected, engagingly connected, rivet connected, expansion connected, lockingly connected, fittingly connected or adhesion connected to a first object.

* * * * *